United States Patent
Talsma et al.

(10) Patent No.: US 11,970,337 B2
(45) Date of Patent: Apr. 30, 2024

(54) POSITIVE-DRIVE SPIRAL CONVEYOR BELT

(71) Applicant: Laitram, L.L.C., Harahan, LA (US)

(72) Inventors: Casper Fedde Talsma, Valencia (ES); David W. Bogle, Round Rock, TX (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 17/737,185

(22) Filed: May 5, 2022

(65) Prior Publication Data
US 2022/0258981 A1    Aug. 18, 2022

Related U.S. Application Data

(60) Continuation of application No. 17/012,197, filed on Sep. 4, 2020, now Pat. No. 11,383,932, which is a continuation of application No. 16/559,757, filed on Sep. 4, 2019, now Pat. No. 10,766,705, which is a continuation of application No. 16/259,577, filed on Jan. 28, 2019, now Pat. No. 10,501,265, which is a continuation of application No. 16/011,031, filed on Jun. 18, 2018, now Pat. No. 10,189,645, which is a continuation of application No. 15/337,147, filed on Oct. 28, 2016, now Pat. No. 10,023,388, which is a division of application No. 13/805,608, filed as (Continued)

(51) Int. Cl.
*B65G 17/08*   (2006.01)
*B65G 15/30*   (2006.01)
*B65G 21/18*   (2006.01)

(52) U.S. Cl.
CPC .......... *B65G 17/086* (2013.01); *B65G 15/30* (2013.01); *B65G 21/18* (2013.01)

(58) Field of Classification Search
CPC ....... B65G 17/086; B65G 15/30; B65G 21/18
See application file for complete search history.

(56) References Cited

U.S. PATENT DOCUMENTS 3,315,492 A     4/1967  Dreksler
3,348,659 A  * 10/1967  Roinestad .............. B65G 21/18
                                                  34/147

(Continued)

FOREIGN PATENT DOCUMENTS

EP         1281641 A1     2/2003

OTHER PUBLICATIONS

Uni-chains Belt Catalog, copyright 2007, pp. 1, 2, 62-68, uni-chains A/S, Denmark.

(Continued)

*Primary Examiner* — Gene O Crawford
*Assistant Examiner* — Lester Ill Rushin
(74) *Attorney, Agent, or Firm* — James T. Cronvich

(57) ABSTRACT

A spiral conveyor for positively driving a conveyor belt along a helical path. The spiral conveyor includes a rotating cylindrical tower with parallel drive members extending from the bottom to the top of the tower on its periphery. Each drive member includes an outwardly protruding ridge that varies in height from the bottom to the top of the tower. The variations in height facilitate the belt's entry onto and exit from the tower and robust, positive driving engagement with the inside edge of the belt along the majority of its path along the tower.

56 Claims, 9 Drawing Sheets

Related U.S. Application Data application No. PCT/US2011/043352 on Jul. 8, 2011, now Pat. No. 9,481,523, which is a continuation-in-part of application No. 12/834,314, filed on Jul. 12, 2010, now Pat. No. 8,181,771.

(60) Provisional application No. 61/479,620, filed on Apr. 27, 2011.

(56) References Cited

U.S. PATENT DOCUMENTS

| | | |
|---|---|---|
| 3,365,158 A | 1/1968 | Dowling |
| 3,664,487 A | 5/1972 | Ballenger |
| 4,036,352 A | 7/1977 | White |
| 4,078,655 A | 3/1978 | Roinestad |
| 4,118,181 A | 10/1978 | Onodera |
| 4,450,953 A | 5/1984 | LeCann et al. |
| 4,741,430 A | 5/1988 | Roinestad |
| 4,852,720 A | 8/1989 | Roinestad |
| 4,858,750 A | 8/1989 | Cawley |
| 4,893,708 A | 1/1990 | Machacek |
| 4,941,566 A | 2/1990 | Irwin |
| 4,944,162 A | 7/1990 | Lang et al. |
| 4,981,208 A | 1/1991 | Jones |
| 5,069,330 A | 12/1991 | Palmaer et al. |
| 5,133,449 A | 7/1992 | Spangler |
| 5,139,135 A | 8/1992 | Irwin et al. |
| 5,310,045 A | 5/1994 | Palmaer et al. |
| 5,372,248 A * | 12/1994 | Horton ................ B65G 17/086 198/852 |
| 5,375,695 A | 12/1994 | Daringer et al. |
| 5,467,865 A | 11/1995 | Irwin |
| 5,566,817 A | 10/1996 | Meeker |
| 6,062,375 A | 5/2000 | Pupp |
| 6,234,322 B1 | 5/2001 | Paladin |
| 6,484,379 B2 | 11/2002 | Palmaer |
| 6,564,930 B1 * | 5/2003 | Colding-Kristensen .................... B65G 21/18 198/831 |
| 6,578,704 B1 | 6/2003 | MacLachlan |
| 7,258,226 B2 | 8/2007 | Nelson et al. |
| 7,347,316 B2 * | 3/2008 | Heber .................. B65G 17/064 198/756 |
| 7,762,388 B2 | 7/2010 | Lago |
| 8,302,764 B2 | 11/2012 | Johnson |
| 8,302,765 B2 | 11/2012 | Lago |
| 8,453,827 B2 | 6/2013 | Corley et al. |
| 9,884,723 B2 | 2/2018 | Neely et al. |
| 10,155,627 B2 | 12/2018 | Chang |
| 10,189,645 B2 | 1/2019 | Talsma et al. |
| 2009/0038916 A1 * | 2/2009 | Van Faassen .......... B65G 21/18 198/778 |
| 2011/0056806 A1 | 3/2011 | Johnson |
| 2012/0006654 A1 | 1/2012 | Talsma |
| 2012/0125742 A1 | 5/2012 | Corley et al. |
| 2013/0213773 A1 | 8/2013 | Talsma et al. |
| 2014/0299450 A1 | 10/2014 | Tassy, Sr. et al. |
| 2019/0389663 A1 | 12/2019 | Talsma et al. |
| 2019/0389664 A1 | 12/2019 | Dale |

OTHER PUBLICATIONS

PTAB Final Written Decision on Remand from the Federal Circuit Determining All Challenged Claims of U.S. Pat. No. 10,023,388 Unpatentable (IPR2020-00593), USPTO, Nov. 27, 2023.

\* cited by examiner

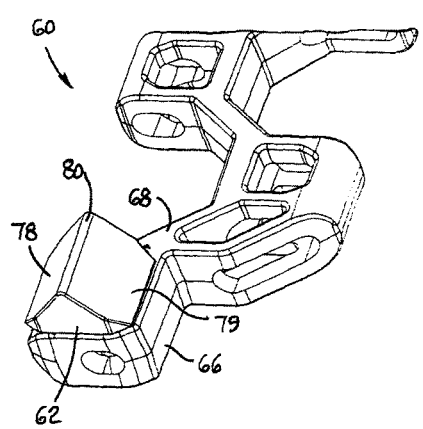 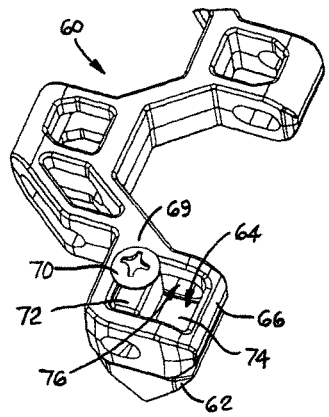
FIG. 5A  FIG. 5B
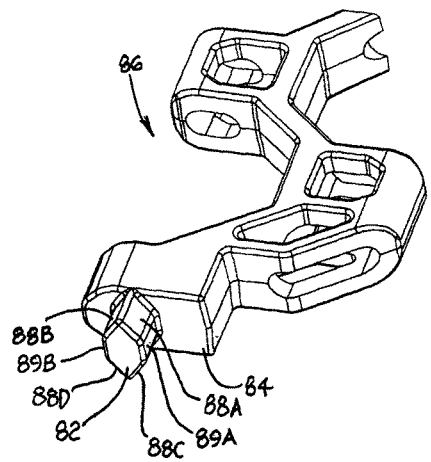
FIG. 6

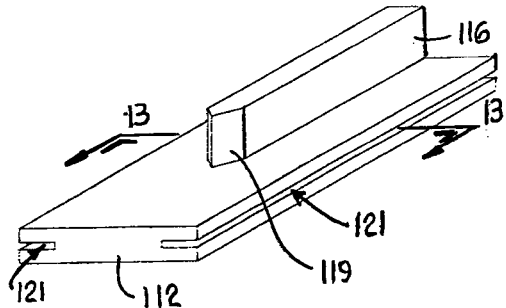
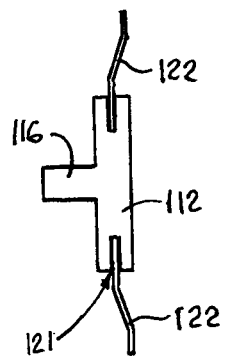
FIG. 12
FIG. 13
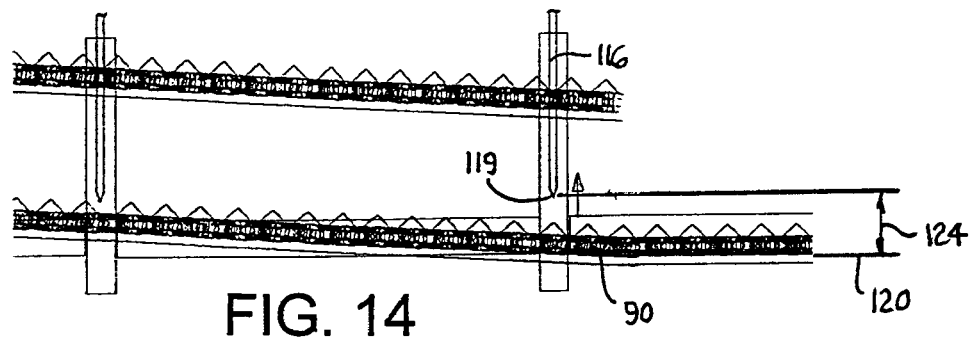
FIG. 14
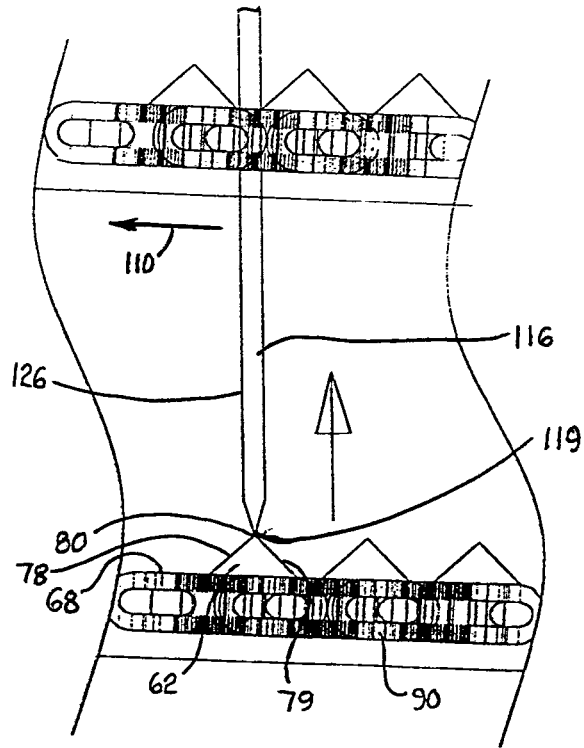
FIG. 15

POSITIVE-DRIVE SPIRAL CONVEYOR BELT

CROSS-REFERENCE TO RELATED APPLICATIONS

This application is a continuation of co-pending U.S. patent application Ser. No. 17/012,197, filed Sep. 4, 2020, which is a continuation of U.S. patent application Ser. No. 16/559,757, filed Sep. 4, 2019, now U.S. Pat. No. 10,766,705, which is a continuation of U.S. patent application Ser. No. 16/259,577, filed Jan. 28, 2019, now U.S. Pat. No. 10,501,265, which is a continuation of U.S. patent application Ser. No. 16/011,031, filed Jun. 18, 2018, now U.S. Pat. No. 10,189,645, which is a continuation of U.S. patent application Ser. No. 15/337,147, filed Oct. 28, 2016, now U.S. Pat. No. 10,023,388, which is a divisional of U.S. patent application Ser. No. 13/805,608, filed Jan. 18, 2013, now U.S. Pat. No. 9,481,523, which is a 371 of PCT/US11/43352, filed Jul. 8, 2011, which claims the benefit of U.S. Provisional Patent Application No. 61/479,620, filed Apr. 27, 2011, and which is a continuation-in-part of U.S. patent application Ser. No. 12/834,314, filed Jul. 12, 2010, now U.S. Pat. No. 8,181,771. The disclosures of those applications are incorporated into this application by reference.

BACKGROUND

The invention relates generally to power-driven conveyors and more particularly to spiral conveyors in which a conveyor belt is positively driven in a helical path around a rotating drive tower.

Conveyor belts are often used to convey articles, such as food stuffs and other materials, through cooled or heated environments. Spiral conveyors, in which a conveyor belt follows a helical path winding around a central tower, drum, or cage, are used in freezers and ovens to provide a long conveying path with a small footprint.

Some helical conveyors are constructed with a helical track supported on a central non-rotating tower. The conveyor belt is driven around the helical track by drive sprockets at a single location outside the helical path. The maximum tension in the belt, which occurs just ahead of its engagement with the drive sprockets, can be quite high for such a long belt. To reduce the maximum belt tension, overdrive spiral conveyor systems are used. In these overdrive systems, the conveyor belt is driven by frictional contact between the inside edge of the belt and the faster-rotating outer surface of the rotating drum about which the belt is helically wrapped. Because the belt is driven along the entire helical path, the maximum belt tension is decreased. But some tension is still needed for effective frictional engagement between the drum and the belt edge. Furthermore, the frictional engagement causes wear in the belt edge and the outer drum surfaces. Because a large portion of the rotational energy required to drive the drum is lost to friction, the motor and power requirements can be quite high. And, because overdrive systems are sensitive to friction between the outside of the drum and the inside edge of the belt, the proper settings of tension and overdrive vary from installation to installation.

Positively driven spiral systems, in which drive structure on the outside of a rotating cage engages structure on the inside of a conveyor belt, have been used to overcome some of the shortcomings of overdrive systems. Because there is positive engagement between regularly spaced drive structure on the cage and regularly spaced edge structure on the inside edge of the belt, there is no slip as in overdrive systems. No additional tensioning is needed, and frictional losses are less. But one problem with positively driven spiral systems is in cleanly engaging the belt with and disengaging it from the drive structure on the cage.

SUMMARY

One version of a spiral conveyor embodying features of the invention comprises a drive tower that is rotatable about a vertical axis and that extends from a bottom to a top with a belt entrance portion of the drive tower at or near the bottom for an upgoing spiral or at or near the top for a downgoing spiral. The drive tower has parallel ridges that project radially outward and extend in length between the bottom and the top of the drive tower at its periphery. The parallel ridges taper outwardly away from the vertical axis toward the bottom for an upgoing spiral or toward the top for a downgoing spiral in at least a portion of the belt entrance portion. A conveyor belt is positively driven without slip in a helical path around the drive tower by the parallel ridges engaging an inside edge of the conveyor belt.

Another version of a spiral conveyor comprises a drive tower that is rotatable about a vertical axis and has an outer periphery that extends from a bottom to a top. A belt entrance is at or near the bottom for an upgoing spiral or at or near the top for a downgoing spiral. Parallel outwardly projecting ridges on the drive tower extend in length from top ends to bottom ends at the periphery of the drive tower between the top and the bottom. A first portion of the ridges is a constant first distance from the vertical axis, and a second portion of the ridges closer to the belt entrance tapers radially outwardly away from the vertical axis toward the belt entrance to a greater second distance. A conveyor belt advances up or down in a conveying direction along a helical conveying path around the outer periphery of the rotating cylindrical drive tower. The conveyor belt includes a plurality of rows of belt modules having a top side and a bottom side and hingedly linked together between consecutive rows along hinge joints defining hinge axes extending perpendicular to the conveying direction from a first side edge of the rows to an opposite second side edge of the rows. The hinge joints have play in the conveying direction to allow the rows to collapse together at the first side edge when the first side edge is at the inside of the helical conveying path. The first side edge of at least some of the rows includes a tooth that extends outwardly to a distal end and has a non-rotatable guide surface parallel to one of the hinge axes of the row. The guide surface is oriented to guide the bottom ends of the ridges in an upgoing spiral or the top ends of the ridges in a downgoing spiral into driving contact with the tooth to drive the conveyor belt in the conveying direction along the helical conveying path without slip.

According to another aspect, a conveyor belt embodying features of the invention comprises a series of rows of belt modules having a top side and a bottom side and hingedly linked together between consecutive rows along hinge joints defining hinge axes extending perpendicular to a conveying direction from a first side edge of the rows to an opposite second side edge of the rows. The hinge joints have play in the conveying direction to allow the rows to collapse together at the first side edge when the first side edge is at the inside of a turn in a conveying path. The first side edge of at least some of the rows includes a tooth that projects radially outward to a distal end and has a non-rotatable guide surface parallel to one of the hinge axes of the row. The guide surface is oriented to guide a top or bottom end of an external drive member into driving contact with the tooth to drive the conveyor belt in the conveying direction without slip.

BRIEF DESCRIPTION OF THE DRAWINGS

These features of the invention, as well as its advantages, are better understood by referring to the following description, appended claims, and accompanying drawings, in which:

FIGS. 5A and 5B are top and bottom axonometric views of an inside edge of a sideflexing conveyor belt module embodying features of the invention;

FIG. 6 is an axonometric view of the inside edge of another version of a sideflexing conveyor belt module embodying features of the invention;

FIG. 12 is an oblique view of a portion of a drive member of a spiral conveyor as in FIG. 11;

FIG. 13 is a cross section of the drive member of FIG. 12 taken along lines 13-13;

FIG. 14 is a side elevation view of a portion of the spiral conveyor of FIG. 11 showing the drive tower at the belt entry level;

FIG. 15 is an enlarged view at the belt entry level of the spiral conveyor of FIG. 11 showing the initial engagement of the conveyor belt with the drive members;

DETAILED DESCRIPTION

Figure 1:
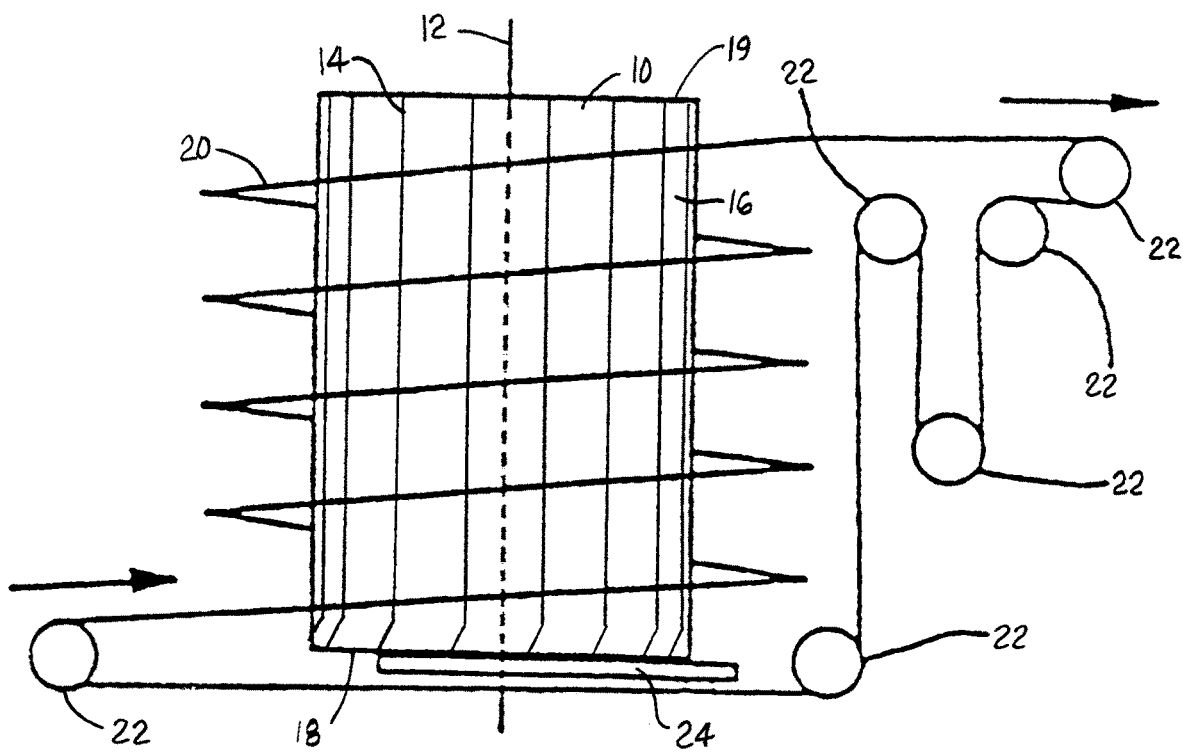
FIG. 1 is a side elevation schematic of a spiral conveyor system embodying features of the invention.

A spiral conveyor is shown schematically in FIG. 1. The spiral conveyor includes a drive tower 10 in the form of a cylindrical drum or cage that is driven to rotate about a vertical axis 12. The rotating tower has a plurality of parallel, generally vertical drive members 14 spaced apart regularly around its periphery 16. Each drive member extends in length between the bottom 18 and the top 19 of the tower. The conveyor belt 20 follows a multi-tiered helical path around the tower. The path is defined by a helical carryway or by a carryway at the bottom and stacker plates mounted on the belt. The inside edge of the belt positively engages the drive members, which drive the belt up the tower as it rotates. The belt travels around various take-up, idle, and feed sprockets 22 as it makes it way from the exit at the top of the tower back to the entrance at the bottom. The tower 10 is mounted at its bottom to a base 24 and is rotated by a motor and gears (not shown).

Figures 2A, 2B:
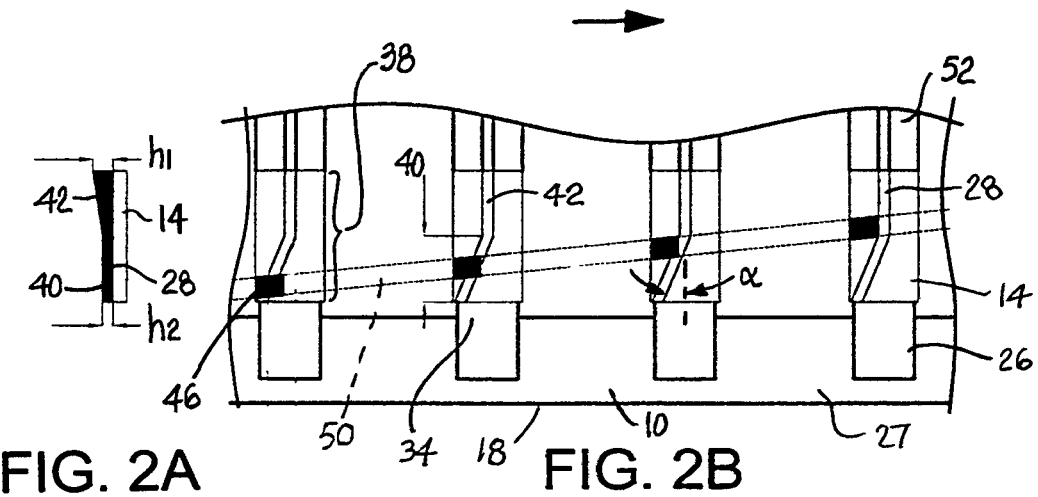
FIGS. 2A and 2B are profile and head-on views of a lower segment of the drive members of the drive tower of FIG. 1.
Figure 2C:
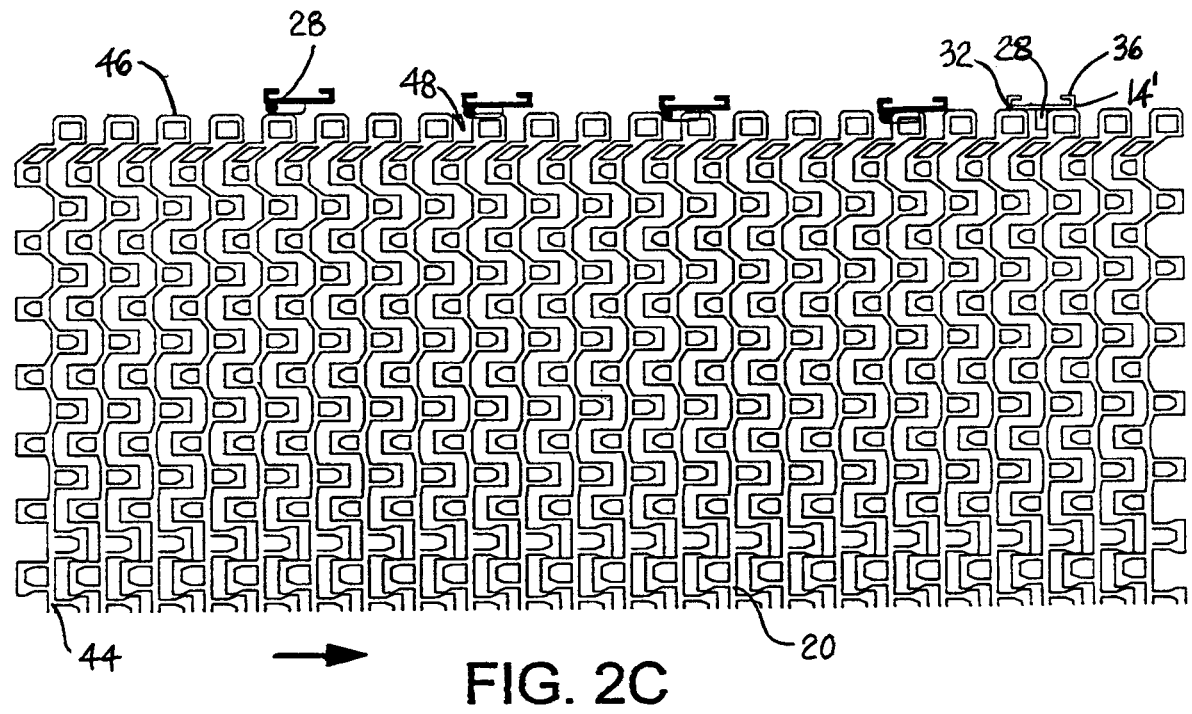
FIG. 2C is a top plan view of the spiral conveyor belt entering the lower segment of the drive members of the drive tower of FIG. 1.

Each of the drive members 14 comprises a generally vertical rail 26, which is affixed at the bottom 18 to a lower ring 27 of the drive tower 10, and a ridge 28 that protrudes outward of the rail, as shown in FIGS. 2A and 2B. The ridge is shown formed on an overlay 32 that covers the outer face 34 of the rail along just about all its length. As shown in FIG. 2C, tabs 36 hold the overlay to the rail. Instead of being formed on an overlay, the ridge could be welded directly onto the rail or formed monolithically with it.

In a lower segment 38 of each drive member, the ridge 28 includes a constant-height region 40 and a tapered region 42. A constant-height region begins at the bottom of the rail and extends upward to the tapered region. The height of the ridge 28 increases from a height $h_2$ in the constant-height region to a maximum height $h_1$ at the upper end of the tapered region. In other words, the distance of the ridge 28 from the vertical axis 12 (FIG. 1) of the drive tower increases from a constant distance to a greater distance at the upper end of the tapered region. The constant-height region of the lower segment 38 is angled off vertical by an angle α.

The off-vertical orientation and the low height $h_2$ of the ridge in the bottom portion of the lower segment of the drive tower facilitate the entry of the conveyor belt 20 onto the rotating tower, as shown in FIGS. 2B and 2C. The conveyor belt 20 is shown as a modular plastic conveyor belt constructed of a series of rows of belt modules 44 conventionally interconnected row-to-row by hinge rods (not shown). As the belt advances tangentially into the rotating tower 10, one of its inside edges 46 may contact one of the ridges 28. As the belt is directed more closely toward the drive tower, the ridge eventually slides off the inside edge and into a gap 48 between adjacent belt rows. The angled orientation of the ridge in the lower segment helps guide the belt into proper engagement as it rides along its inclined helical path 50. By the time the belt reaches the tapered region 42 of the lower segment 38 of the drive members, the ridge has assumed a position just upstream of the inside edge of a belt row. In this position, the driving member is engaged with the inside edge of the belt to positively drive it along the helical path 50 without slip. In the tapered region 42, the ridge gradually increases in height to its maximum height $h_1$. The gradual increase further aids in the transition of the belt into full positive engagement with the rotating tower, as indicated by the max-height drive member 14'.

Figures 3A, 3B:
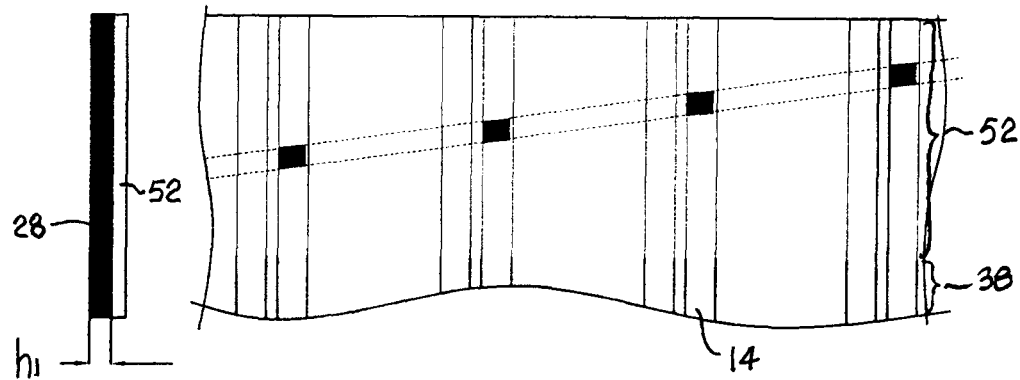
FIGS. 3A and 3B are profile and head-on views of an intermediate segment of the drive members of the drive tower of FIG. 1.
Figures 4A, 4B:
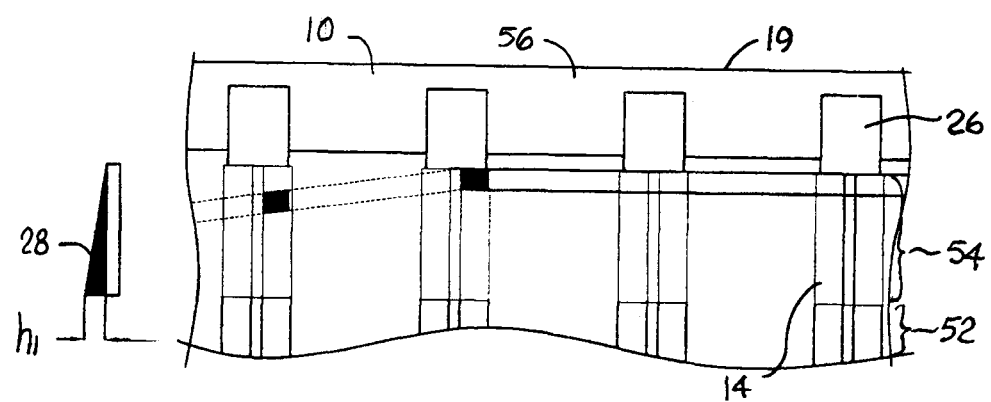
FIGS. 4A and 4B are profile and head-on views of an upper segment of the drive members of the drive tower of FIG. 1.

The ridge 28 extends out to the maximum height $h_1$ in an intermediate segment 52 of each drive member 14. In the intermediate segment, the distance of the ridge from the vertical axis 12 (FIG. 1) is constant. The intermediate segment is disposed on the periphery of the drive tower just above the lower segment 38, as shown in FIGS. 3A and 3B. The intermediate segment constitutes the majority of the height of the tower and, consequently, provides most of the driving engagement with the conveyor belt. The intermediate segment may be vertical as shown or slanted off vertical. Just ahead of the belt's exit from the top 19 of the tower 10, the height of the ridge tapers from the maximum height $h_1$ to zero at the top, as shown in FIGS. 4A and 4B. The tapering occurs in an upper segment 54 of each drive member 14. The top of each rail is affixed to an upper rim 56. The decreasing height of the ridge 28, or its distance from the drive tower's vertical axis, in the upper segment allows the belt to disengage gradually and neatly from the drive members of the rotating tower.

Thus, the spiral conveyor of FIGS. 1-4 positively drives a conveyor belt without overdrive along a helical path with drive members that engage the inside edge of the belt with a ridge that varies in height from the bottom to the top of the rotating spiral drive tower.

Figure 7:
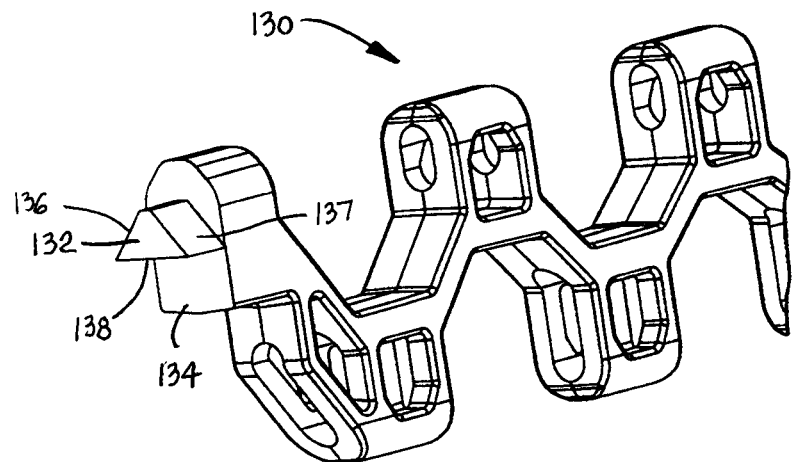
FIG. 7 is an axonometric view of the inside edge of yet another version of a sideflexing conveyor belt module embodying features of the invention.

An edge belt module 60 shown in FIGS. 5A and 5B can be used to construct a sideflexing conveyor belt with different edge structure from that of the belt 20 of FIG. 2C. The edge module 60 has a tent-shaped tooth 62 attached to a cavity 64 in a side edge 66 of the belt. The tooth is pressed into the cavity 64 from the top side 68 of the module. The head of a screw 70 screwed into a corner of a projection 72 extending from the base 74 of the tooth grabs the bottom side 69 of the module at an inside corner of the cavity to attach the tooth to the module. The tooth can be detached from the module by removing the screw. The projection 72 also partially occludes the module's pivot rod hole 76 to help retain the hinge rod within the belt. In this version of the edge module, the tooth could be inserted from the bottom side 69 instead and retained in the same way. So these teeth can extend upward from the top side 68 or downward from the bottom side 69. The tent-shaped tooth has a pair of guide surfaces 78, 79 that converge with distance from the distal end 80 of the tooth. Another version of a tooth extending from the inside edge of a belt module is shown in FIG. 6. In this module, a diamond-prism-shaped tooth 82 extends radially outward of the inside edge 84 of the module 86. The diamond-shaped tooth is unitarily molded with the module and has four guide surfaces 88A-D and two vertical drive faces 89A, 89B. It should be clear that the tent-shaped tooth 62 of FIGS. 5A and 5B could be unitarily formed with the edge module and the diamond-shaped tooth of FIG. 6 could be made as a separate piece that can be attached to the module. Another belt module with a unitarily molded tooth is shown in FIG. 7. The belt module 130 has a tooth 132 in the shape of a truncated triangular prism projecting radially outward from an inside edge 134 of the module. Guide surfaces 136, 137 converge from top and bottom surfaces of the module. The base of the triangular prism acts as a drive face 138. The belt module 140 of FIG. 8 has a tooth 142 in the form of a cylindrical oval. The tooth has rounded guide surfaces 144, 145 with opposite drive faces 146, 147 lying between.

Figure 10:
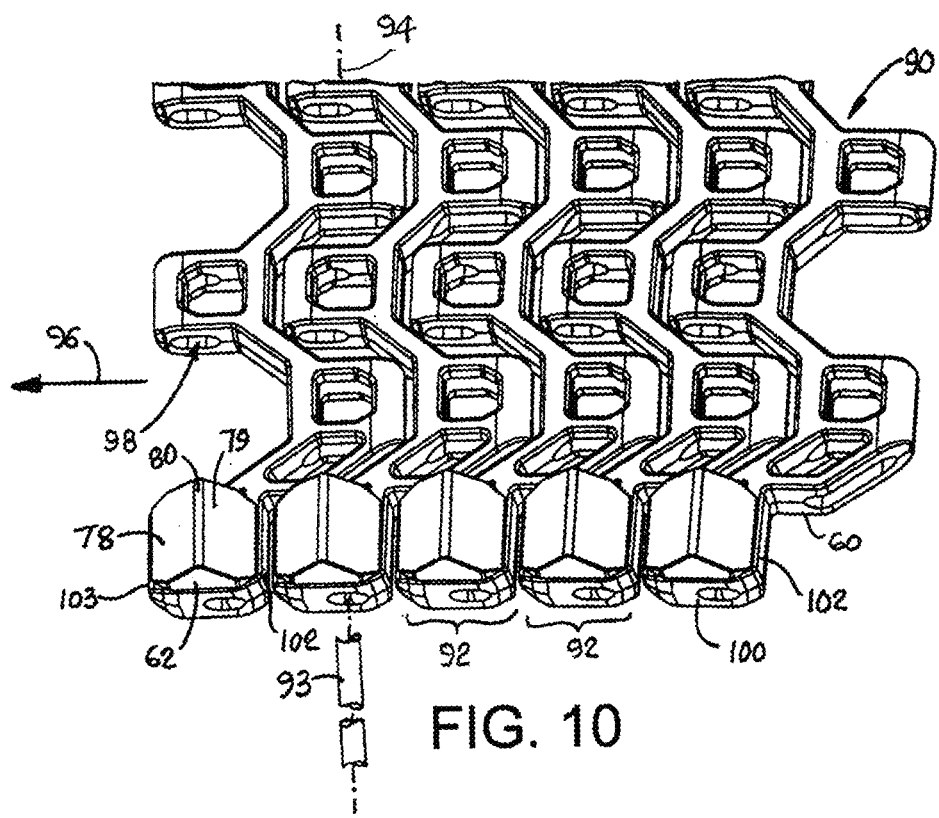
FIG. 10 is an axonometric view of a portion of the inside edge of a conveyor belt constructed of the modules of FIGS. 5A and 5B.

A portion of a conveyor belt 90 made of modules having an inside edge as in FIGS. 5A and 5B is shown in FIG. 10. The belt portion shows the modules linked together in rows 92 by hinge rods 93 at hinge joints 94 extending perpendicular to the conveying direction 96. The pitch of the belt is the distance between consecutive hinges. Hinge-rod apertures 98 are elongated in the conveying direction to provide enough play in the conveying direction for the side edge 100 of the belt to collapse at the inside of a turn while the opposite outside edge expands to follow its longer path on an outer radius. Because the belt 90 can be in low tension entering a spiral drive tower, the rows may be collapsed together as shown in FIG. 10. The trailing guide surfaces 79 of the teeth 62 decline from their distal ends 80 toward drive faces 102 facing consecutive trailing modules. The leading guide surfaces 78 of the teeth 62 decline from their distal ends 80 in the opposite direction toward rearward-facing drive faces 102 on consecutive leading modules. Opposite faces 103 on the edges of the belt can be used as drive faces if the belt is operated in the opposite direction.

Figure 11:
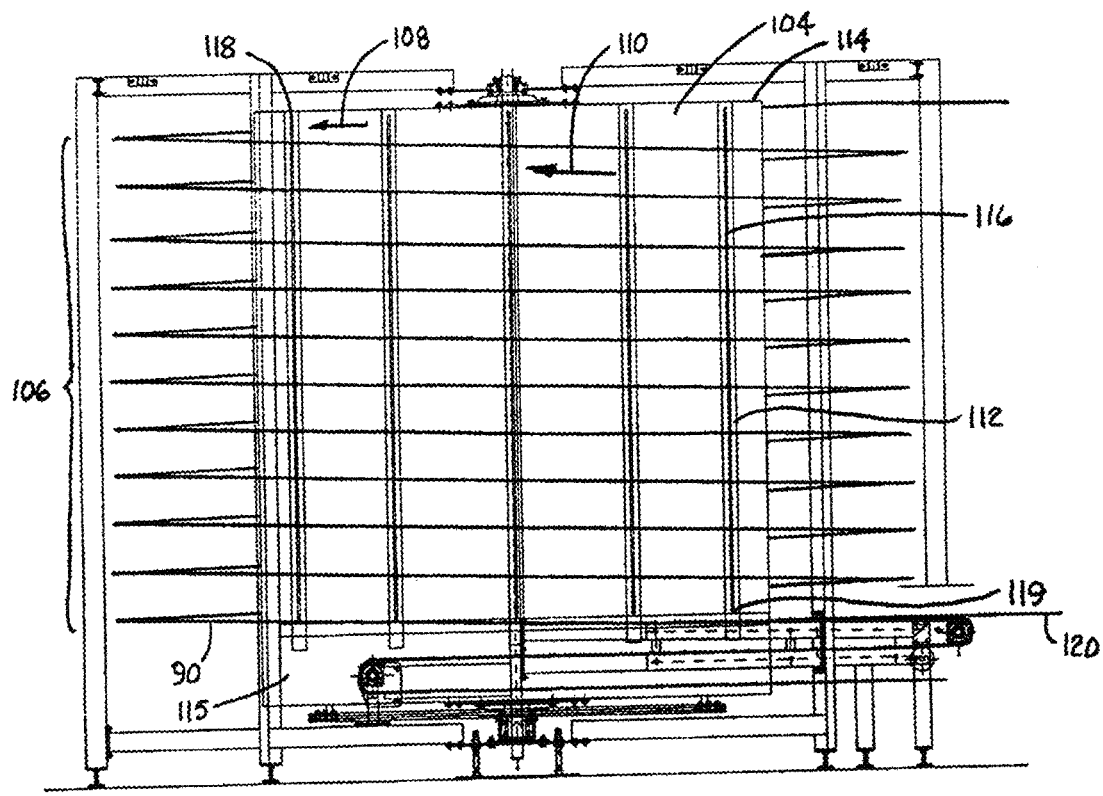
FIG. 11 is a side elevation view of another spiral conveyor using a modular conveyor belt as in FIGS. 5-8.

A spiral drive tower 104 is shown in FIG. 11 with the conveyor belt 90 following a helical path 106 around the periphery of the tower. Vertical drive members 112 extend in length from the top 114 to the bottom 115 of the tower. The drive members are preferably positioned on spacings equal to an integral multiple of the belt pitch for optimal operating characteristics. But they could also be spaced at non-integral multiples of the belt pitch or non-uniformly at differing integral multiples of the belt pitch. Ridges 116 protrude radially outward of the spaced apart drive members 112 from top ends 118 of the ridges to bottom ends 119. In this example, the conveyor is an upgoing spiral rotating in the direction 108 with a helically rising conveying direction 110. The belt initially engages the tower at a belt entry level 120 that is below the bottom ends 119 of the ridges. The belt rides around the tower on a slightly inclined path for about 90° or so, or whatever circumferential arc length is needed for the inside edge of the belt to collapse, before rising to the level of the bottom ends 119 of the ridges 116.

As shown in FIGS. 12 and 13, the bottom end 119 of the ridge 116 is tapered. The drive member 112 is a flat strip with the ridge protruding outward along the majority of its length. Grooves 121 in opposite edges of the strip receive the edges of peripheral structure 122 forming the tower's periphery.

The engagement of the conveyor belt with an upgoing spiral is shown in FIGS. 14 and 15. FIG. 14 shows the bottom tier of the conveyor belt engaging the tower below the bottom ends 119 of the ridges 116. The bottom ends of the ridges are indented a vertical distance 124 above the belt entry level 120. In this indented portion of the tower, the inside edge of the belt rides along the tower in frictional contact with the periphery of the tower to give the inside edge of the belt an opportunity to collapse. Eventually the belt 90 rises to the bottom ends 119 of the ridges 116. The distal end 119 of the ridge 116 first contacts the tooth 62 extending upward from the top side 68 of one of the belt rows in one of three places: (a) the leading guide surface 78; (b) the trailing guide surface 79; or (c) the distal end 80. If the initial contact is on the leading guide surface 78, the bottom end 119 of the ridge tends to ride down the leading guide surface and push the row rearward away from the leading row so that the ridge fits between the rows in a position to positively drive the leading row. If the bottom end 119 of the ridge 116 first contacts the trailing guide surface 79, the bottom end slides down the guide surface into the gap between the row and the consecutive trailing row into a position for the leading side 126 of the ridge to impart a driving force against the drive face 102 (FIG. 10) of the row. If the bottom end of the ridge initially contacts the top distal end 80 of the tooth 62, the ridge could slide down either guide surface, depending on friction and any belt tension.

Figure 8:
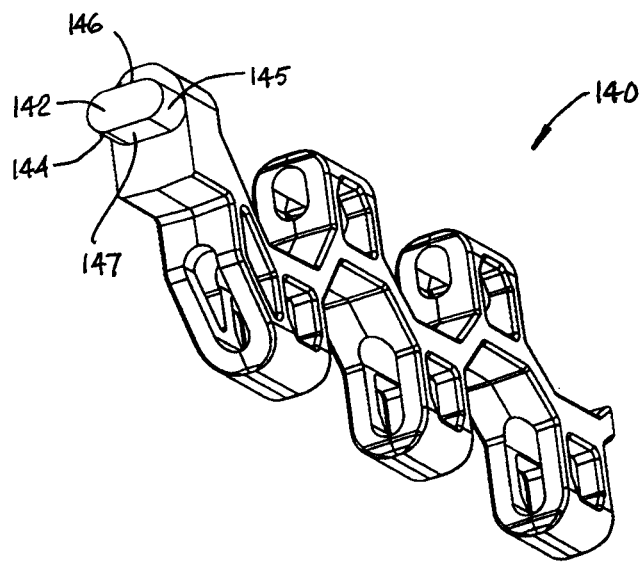
FIG. 8 is an axonometric view of the inside edge of still another version of a sideflexing conveyor belt module embodying features of the invention.

In a downgoing spiral, the operation is analogous. The belt entry level is above the top ends of the ridges at the top of the tower. The ridges are indented below the entry level by a vertical distance sufficient to allow the inside edge of the belt to collapse against the periphery of the tower. The teeth for a belt in a downgoing spiral extend downward from the bottom side of the belt to engage the top ends of the ridges. A conveyor belt constructed of modules as in FIG. 6 with guide surfaces 88A-D directed both up and down and drive faces 89A, 89B or as in FIG. 8 with rounded to and bottom guide surfaces 144, 145 and drive faces 146, 147 could be used in both downgoing and upgoing spirals and driven in either direction. The teeth in FIGS. 6 and 8 are symmetrical about their vertical and horizontal centerlines. The two guide surfaces 136, 137 of the triangular tooth 132 in the module of FIG. 7 allow a conveyor belt constructed of such modules to be driven against its drive face 147 in either an upgoing or a downgoing spiral.

Figure 9:
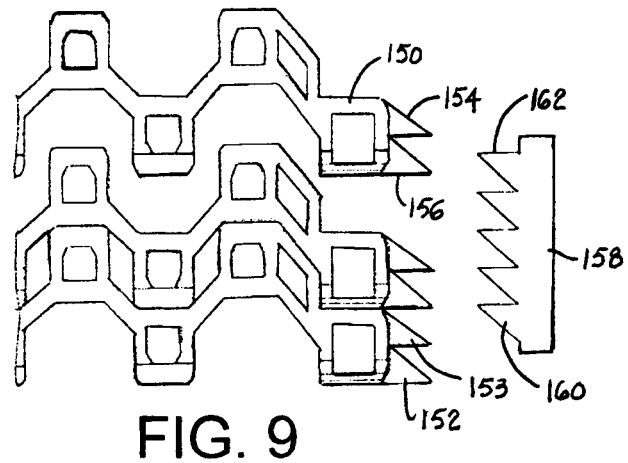
FIG. 9 is a top plan view of the inside edge of another version of a sideflexing conveyor belt and the periphery of a drive tower embodying features of the invention.

FIG. 9 shows a sideflexing conveyor belt with edge modules 150 that have multiple teeth extending radially outward of each row. Each of the teeth 152, 153 has a leading angled guide surface 154 and a trailing drive face 156 forming a sawtooth shape. Each drive member 158 on the periphery of the drive tower has a plurality of sawtooth-shaped ridges 160 with leading drive sides 162. The guide surfaces 154 guide leading drive sides 162 of the ridges into driving contact with a leading drive face 156. The ridges on the tower are slightly thinner than the teeth on the belt so that they interfit more easily. And the higher tooth density provides the drive tower with more available points of engagement.

Figure 16:
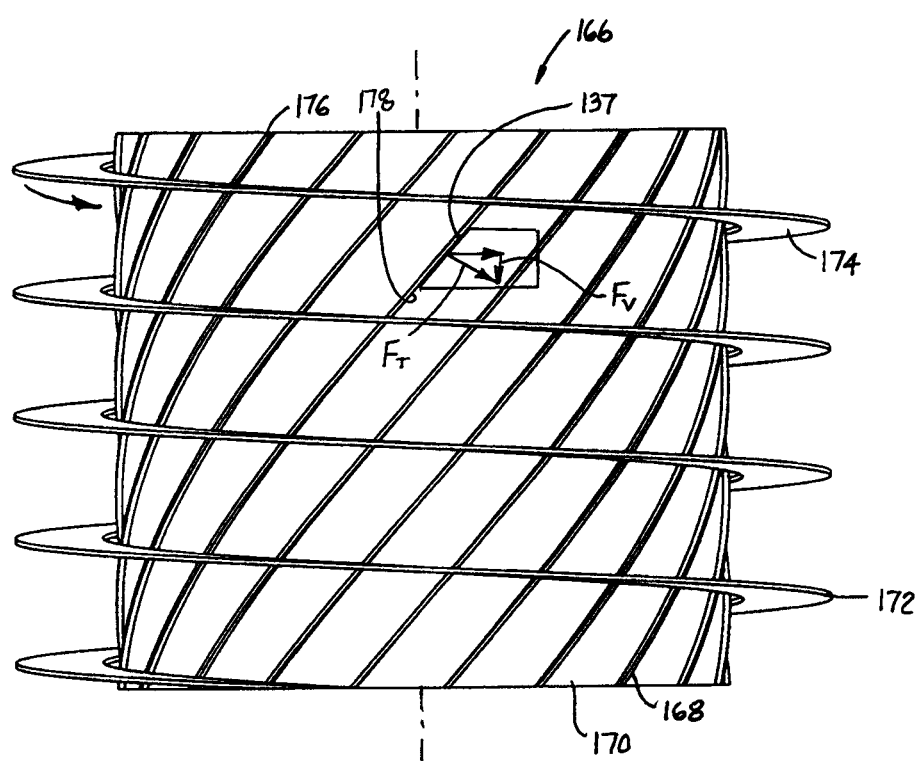
FIG. 16 is a side elevation view, with a superimposed force diagram, of another version of a spiral drive tower with helical drive bars on the periphery of the tower usable with conveyor belts made of modules as in FIGS. 5-8.

Even though the drive members on the peripheries of the drive tower shown in FIGS. 1-4 and in the drive tower shown in FIGS. 11-15 are generally vertical, the drive members could be slanted off vertical as shown in FIG. 16. The drive tower 166 has ridges 168 on its drive members slanted off vertical on the periphery 170 of the tower to form a helical arrangement. A conveyor belt 172 is shown operating as a downgoing spiral along a helical path 174. The belt is constructed with edge modules having teeth as in FIG. 7, i.e., teeth with a face oblique to the conveying direction, preferably at the same angle as the slant of the drive ridges off vertical. The bottom guide surface 136 guides the top end 176 of the drive members into initial contact with the belt edge. The leading edges 178 of the ridges engage the edge modules' top guide surfaces 137, which act as drive surfaces instead. The force diagram superimposed on the tower of FIG. 16 shows that the total force FT applied by the leading side 178 of the slanted ridge 168 against the similarly slanted tooth face 137 (shown enlarged) and acting in a direction normal to the face has a downward vertical component $F_V$, which helps hold the inside edge of the conveyor belt down. This obviates the need for the additional hold down structure that would be needed with a conveyor belt entering a spiral drive tower with vertical drive members as in the previous versions. And with the forward-slanted ridges of FIG. 16, the conveyor belt would move faster than the rotation of the drive tower. If the ridges were slanted in reverse, the belt would move slower.

Figure 17:
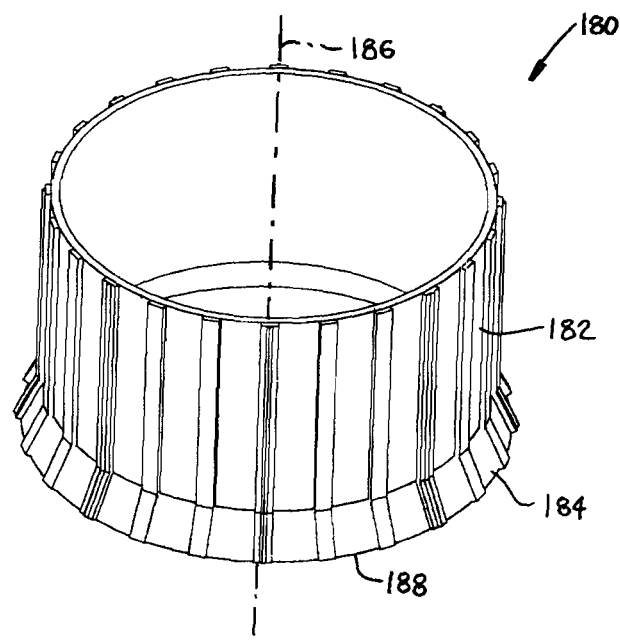
FIGS. 17 and 18 are oblique views of two other versions of drive towers with outwardly extending bottom skirt portions usable with conveyor belts made of modules as in FIGS. 5-8.
Figure 18:
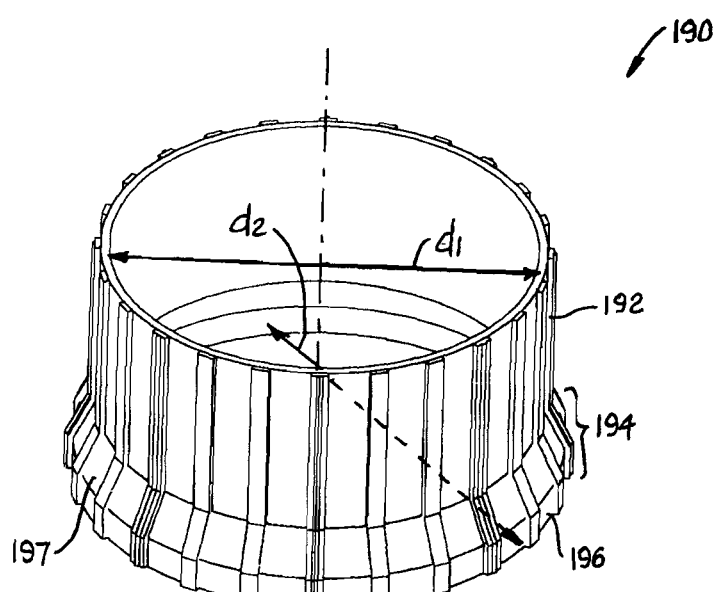

Two other versions of drive towers are shown in FIGS. 17 and 18. The drive tower 180 in FIG. 17 has a cylindrical upper portion 182 and a skirt portion 184 the tapers outwardly away from the tower's vertical axis 186 toward the bottom 188 of the tower. The drive tower 190 in FIG. 18 has an upper portion 192 with a first diameter $d_1$. A skirt portion 194 includes a bottom portion 196 having a second diameter $d_2$ that is greater than the first diameter $d_1$ of the upper portion 192. A tapered portion 197 connects the bottom portion 196 to the upper portion 192. (The degree of taper is exaggerated in the drawings.) A conveyor belt entering either of the skirted drive towers from the bottom has some amount of initial tension in the outside edge of the belt. As the inside edge of the conveyor belt begins to collapse as it rides spirally up the skirt portion of the tower, the diameter of the tower decreases slightly in the skirt portion to help relieve the tension in the outside edge of the conveyor belt.

Thus, the spiral conveyors of FIGS. 11-18 positively drive a conveyor belt without overdrive along a helical path with drive members that engage the inside edge of the belt with a ridge that is initially guided into a driving position against a drive face on the belt. And the spiral conveyor system also allows the use of belts whose inside turn radius does not match the radius of the drive tower.

What is claimed is:

1. A conveyor belt comprising:
   a series of rows of belt modules having a top side and a bottom side and hingedly linked together between consecutive rows along hinge joints defining hinge axes extending perpendicular to a conveying direction from a first side edge of the rows to an opposite second side edge of the rows, wherein the hinge joints have play in the conveying direction to allow the rows to collapse together at the first side edge when the first side edge is at the inside of a turn in a conveying path;
   a plurality of protrusions, each protrusion projecting outward at the first side edge of one of the rows to a flat distal end and having at least one drive face perpendicular to the conveying direction and a constant cross section in planes perpendicular to one of the hinge axes of the row;
   wherein the constant cross section has a minor axis in the conveying direction and a longer major axis perpendicular to the conveying direction and to the hinge joints;
   wherein the at least one drive face is contacted by an external drive member to drive the conveyor belt in the conveying direction.

2. The conveyor belt of claim 1 wherein the constant cross section has an oval outline.

3. The conveyor belt of claim 2 wherein each protrusion has an upper guide surface defining a curved portion of the oval outline, a lower guide surface defining an opposite curved portion of the oval outline, a leading drive face defining a straight portion of the oval outline, and a trailing drive face defining an opposite straight portion of the oval outline, wherein the upper and lower guide surfaces are configured to guide a bottom or top end of an external drive member into driving contact with the trailing drive face of the row or of the consecutive leading row.

4. The conveyor belt of claim 1 wherein the constant cross section has a line of symmetry.

5. The conveyor belt of claim 1 wherein the protrusions are integrally formed with the belt modules.

6. The conveyor belt of claim 1 wherein the protrusions are non-rotatable.

7. A conveyor belt comprising:
   a series of rows of belt modules having a top side and a bottom side and hingedly linked together between consecutive rows along hinge joints defining hinge axes extending perpendicular to a conveying direction from a first side edge of the rows to an opposite second side edge of the rows, wherein the hinge joints have play in the conveying direction to allow the rows to collapse together at the first side edge when the first side edge is at the inside of a turn in a conveying path;
   a plurality of non-rotatable protrusions, each non-rotatable protrusion projecting outward at the first side edge of one of the rows and having a leading face and a trailing drive face and a guide surface extending from a peak in diverging directions to the leading face and the trailing drive face;

wherein the guide surface is configured to guide an external drive member into driving contact with the trailing drive face of the row or of the consecutive leading row;

wherein the guide surface extends from the peak in diverging directions along diverging flat or curved guide-surface regions.

8. The conveyor belt of claim 7 wherein the non-rotatable protrusion has a second guide surface opposite the first guide surface and that extends from a peak in opposite directions to the leading face and the trailing drive face.

9. The conveyor belt of claim 7 wherein the non-rotatable protrusion projects outward to a distal end having a flat face perpendicular to one of the hinge axes of the row.

10. The conveyor belt of claim 7 wherein the guide surface is parallel to one of the hinge axes of the row.

11. The conveyor belt of claim 7 wherein the leading face and the trailing drive face are parallel to one of the hinge axes of the row.

12. The conveyor belt of claim 7 wherein the non-rotatable protrusions are integrally formed with the belt modules.

13. The conveyor belt of claim 7 wherein the leading face and the trailing drive face are flat.

14. A conveyor belt comprising:
a series of rows of belt modules having a top side and a bottom side and hingedly linked together between consecutive rows along hinge joints defining hinge axes extending perpendicular to a conveying direction from a first side edge of the rows to an opposite second side edge of the rows, wherein the hinge joints have play in the conveying direction to allow the rows to collapse together at the first side edge when the first side edge is at the inside of a turn in a conveying path;
a plurality of non-rotatable protrusions, each non-rotatable protrusion projecting outward at the first side edge of one of the rows to a flat distal end and having upper and lower guide surfaces, a leading face, and a trailing drive face;
wherein cross sections of the non-rotatable protrusion in planes perpendicular to one of the hinge axes of the row have a first line of symmetry that intersects the upper and lower guide surfaces and a second line of symmetry that intersects the leading face and the trailing drive face;
wherein the distance between the upper and lower guide surfaces along the first line of symmetry is longer than the distance between the leading face and the trailing drive face along the second line of symmetry;
wherein the upper and lower guide surfaces are configured to guide an external drive member into driving contact with the trailing drive face of the row or of the consecutive leading row to drive the conveyor belt in the conveying direction.

15. The conveyor belt of claim 14 wherein the cross sections have an oval outline.

16. The conveyor belt of claim 15 wherein, in each non-rotatable protrusion, the upper guide surface defines a curved portion of the oval outline, the lower guide surface defines an opposite curved portion of the oval outline, the leading face defines a straight portion of the oval outline, and the trailing drive face defines an opposite straight portion of the oval outline.

17. The conveyor belt of claim 14 wherein the upper and lower guide surfaces are curved and wherein the leading face and the trailing drive face are flat.

18. The conveyor belt of claim 14 wherein the upper and lower guide surfaces, the leading face, and the trailing drive face are flat.

19. A conveyor belt comprising:
a series of rows of belt modules having a top side and a bottom side and hingedly linked together between consecutive rows along hinge joints defining hinge axes extending perpendicular to a conveying direction from a first side edge of the rows to an opposite second side edge of the rows, wherein the hinge joints have play in the conveying direction to allow the rows to collapse together at the first side edge when the first side edge is at the inside of a turn in a conveying path;
a plurality of non-rotatable protrusions, each non-rotatable protrusion projecting outward at the first side edge of one of the rows and having a peripheral surface parallel to one of the hinge axes of the row;
wherein a first portion of the peripheral surface defines a first guide surface and a contiguous second portion of the peripheral surface defines a first drive face;
wherein the guide surface is configured to guide an external drive member into driving contact with the first drive face of the row or of the consecutive leading row.

20. The conveyor belt of claim 19 wherein a third portion of the peripheral surface defines a second guide surface opposite the first guide surface and a contiguous fourth portion of the peripheral surface defines a second drive face opposite the first drive face.

21. The conveyor belt of claim 20 wherein the second and fourth portions of the peripheral surface are flat.

22. The conveyor belt of claim 20 wherein the first and third portions of the peripheral surface are convexly curved.

23. The conveyor belt of claim 19 wherein each of the non-rotatable protrusions extends outward to a distal end having a flat face lying in a plane perpendicular to one of the hinge axes of the row.

24. The conveyor belt of claim 19 wherein the peripheral surface defines an oval shape.

25. The conveyor belt of claim 19 wherein the first portion of the peripheral surface is tent-shaped.

26. The conveyor belt of claim 19 wherein the first drive face of the non-rotatable protrusion of each row is located at the first side edge between the hinge joints of the row.

27. A side-flexing conveyor belt comprising:
a plurality of belt modules, each belt module comprising:
a forward end and a rearward end;
alternating forward hinge sections at the forward end and rearward hinge sections at the rearward end connected by an angled connector,
wherein the forward hinge sections extend to a forward end in a conveying direction of the conveyor belt and wherein the rearward hinge sections extend to a rearward end in a direction opposite to the conveying direction of the conveyor belt;
wherein the forward hinge sections are separated by spaces sized to receive the rearward hinge sections of a preceding belt module, and the rearward hinge sections are separated by spaces sized to receive the forward hinge sections of a subsequent belt module such that sequential belt modules interlink;
wherein each of the forward hinge sections and the rearward hinge sections include hinge apertures located medially between a top surface and a bottom surface of a belt module,
wherein the hinge apertures of the forward hinge sections, of the rearward hinge sections, or of both are elongated in a direction parallel to the conveying direction of the conveyor belt; and a protrusion comprising:
  a drive face having a substantially planar surface located between the forward and rearward ends; and
  a rounded portion, and
  wherein the drive face is configured to engage a drive element of a rotating belt driver such that the drive element pushes against the drive face in the conveying direction to positively drive the belt along a conveying path,
  wherein the drive face has a surface area sufficient to establish non-slip contact with the drive element,
  wherein the protrusion is dimensioned such that a gap is maintained between adjacent protrusions when the belt is fully collapsed; and
a plurality of hinge rods extending perpendicular to the conveying direction through the hinge apertures of the forward hinge sections of each belt module and the rearward hinge sections of the preceding belt module to connect the plurality of belt modules into a continuous belt,
wherein the elongated hinge apertures allow the belt to traverse a spiral path in which a separation distance between the belt modules proximal to an inner radius is less than the separation distance between the belt modules proximal to an outer radius.

28. The side-flexing conveyor belt of claim 27 wherein the protrusion is removably attached to the belt module.

29. The side-flexing conveyor belt of claim 27 wherein a terminal end of the protrusion is flat.

30. The side-flexing conveyor belt of claim 27 wherein the spaces between the forward hinge sections and the spaces between the rearward hinge sections are defined by at least five edges of the belt module.

31. The side-flexing conveyor belt of claim 27 wherein the belt module further comprises a first curved surface connecting the top surface and the bottom surface with a leading face of the forward hinge sections and a second curved surface connecting the top surface and the bottom surface with a trailing face of the rearward hinge sections.

32. The side-flexing conveyor belt of claim 27 wherein the protrusion is non-rotatable.

33. A side-flexing conveyor belt comprising a plurality of belt modules, wherein each belt module comprises:
  alternating forward hinge sections and rearward hinge sections connected by an angled connector, wherein the forward hinge sections are separated by spaces sized to receive the rearward hinge sections of a preceding belt module, and the rearward hinge sections are separated by spaces sized to receive the forward hinge sections of a subsequent belt module such that the belt modules interlink;
  hinge apertures in the forward hinge sections, in the rearward hinge sections, or in both located medially between a top surface and a bottom surface of the belt module, wherein the hinge apertures are elongated in a direction parallel to a conveying direction of the belt,
  a hinging component inserted into the hinge apertures to hingedly connect the forward hinge sections of the belt module to the rearward hinge sections of a preceding belt module at hinge joints to create a continuous belt,
  wherein the elongation of the hinge apertures allows the belt to expand and collapse dynamically such that a distance separating the belt modules proximal to an inner radius of a curve is less than a distance separating the belt modules proximal to an outer radius of the curve; and
  a protrusion extending from a driving edge of the belt module proximal to the inner radius of a curve,
  wherein the protrusion is sized to maintain a gap between protrusions of adjacent belt modules at the inner radius of a curve when the belt is fully collapsed, and
  wherein the protrusion is an ovoid shape with a drive face and first line of symmetry longer than a perpendicular line of symmetry.

34. The side-flexing conveyor belt of claim 33 wherein the protrusion is removably attached to the belt module.

35. The side-flexing conveyor belt of claim 33 wherein a terminal end of the protrusion is flat.

36. The side-flexing conveyor belt of claim 33 wherein the ovoid shape of the protrusion is oriented such that the first line of symmetry is vertical.

37. The side-flexing conveyor belt of claim 36 wherein the ovoid shape of the protrusion comprises two planar surfaces oriented vertically, a first rounded surface as the top of the protrusion and a second rounded surface as the bottom of the protrusion.

38. The side-flexing conveyor belt of claim 33 wherein the spaces between the forward hinge sections are defined by at least two opposing faces of neighboring forward hinge sections, two faces of angular connectors, and one face of a rearward hinge section in an incomplete octagonal shape.

39. The side-flexing conveyor belt of claim 33 wherein the spaces between the rearward hinge sections are defined by at least two opposing faces of neighboring rearward hinge sections, two faces of angular connectors, and one face of a forward hinge section in an incomplete octagonal shape.

40. The side-flexing conveyor belt of claim 33 wherein the belt module further comprises vertically aligned holes in the top surface and the bottom surface.

41. The side-flexing conveyor belt of claim 33 wherein the belt module further comprises a first curved surface connecting the top surface and the bottom surface with a leading face of the forward hinge sections and a second curved surface connecting the top surface and the bottom surface with a trailing face of the rearward hinge sections.

42. The side-flexing conveyor belt of claim 33 wherein the belt is positively driven on a spiral conveying path when the protrusions engage with engagement members of a drive tower.

43. The side-flexing conveyor belt of claim 33 wherein the hinging component is a hinge rod extending the width of the side-flexing conveyor belt.

44. The side-flexing conveyor belt of claim 33 wherein the protrusion is non-rotatable.

45. The side-flexing conveyor belt of claim 33 wherein the hinge joints define hinge axes and wherein the drive face of the protrusion extending from the driving edge of the belt module is located between the hinge axes of the belt module.

46. A side-flexing conveyor belt comprising:
  a plurality of hinge rods extending along hinge axes perpendicular to a conveying direction of the conveyor belt;
  a plurality of hinge-rod connectors connecting two hinge rods in succession through at least one elongated hinge aperture such that the hinge rods slide within the elongated hinge aperture allowing the conveyor belt to expand and collapse dynamically;
  wherein a distance between two successive hinge rods near an inner edge of the conveyor belt is less than a distance separating the two successive hinge rods at an outer edge of the conveyor belt when navigating a turn along the conveying path;

a protrusion extending radially outward from the inner edge with at least one drive face configured to make non-slip contact with a driving member ridge surface of a rotating belt driver such that the driving member ridge surface imparts a driving force in the conveying direction against the drive face to positively drive the conveyor belt along the conveying path;

wherein the protrusion comprises at least one rounded surface for proper engagement of the protrusion with the driving member ridge surface.

47. The side-flexing conveyor belt of claim 46 wherein the drive face is flat.

48. The side-flexing conveyor belt of claim 46 wherein the protrusion has a vertical line of symmetry.

49. The side-flexing conveyor belt of claim 46 wherein the protrusion is non-rotatable.

50. The side-flexing conveyor belt of claim 46 wherein the protrusion from each of the hinge-rod connectors is located between the hinge axes of two successive hinge rods of the hinge-rod connector.

51. A side-flexing conveyor belt comprising:

a plurality of belt modules, each belt module comprising:
   alternating forward hinge sections and rearward hinge sections each having hinge apertures located medially between a top surface and a bottom surface of the belt module;
   wherein the hinge apertures of the forward hinge sections or of the rearward hinge sections or of both are elongated in a direction parallel to a conveying direction of the conveyor belt;
   wherein the forward hinge sections are separated by spaces sized to receive the rearward hinge sections of a preceding belt module and wherein the rearward hinge sections are separated by spaces sized to receive the forward hinge sections of a subsequent belt module so that the belt modules interlink;
   a protrusion extending radially outward from an inner edge of the belt module at the inside of a turn in the conveying direction and having at least one drive face configured to make non-slip contact with a ridge surface of a rotating belt driver so that the ridge surface imparts a driving force in the conveying direction against the drive face to positively drive the conveyor belt along the conveying path;
   wherein the protrusion has at least one rounded surface to allow engagement of the protrusion with the ridge surface;
   wherein the protrusion is sized to maintain a gap between the drive face and a surface of the protrusion on an adjacent belt module and wherein the gap is sufficiently sized to receive the ridge surfaces of the belt driver when the inner edge of the conveyor belt is in a collapsed state;
a plurality of hinge rods extending perpendicular to the conveying direction through the hinge apertures of alternating forward hinge sections and rearward hinge sections in succession to connect the plurality of belt modules into a continuous conveyor belt;

wherein the elongation of the hinge apertures allows a distance separating the belt modules to vary dynamically so that the conveyor belt can expand and collapse such that, when the conveyor belt is negotiating a turn, the distance separating the belt modules near their inner edges at the inside of the turn is less than the distance separating the belt modules near their outer edges at the outside of the turn to maintain the belt planar.

52. The side-flexing conveyor belt of claim 51 wherein, as the conveyor belt traverses a spiral path from a lower portion of the rotating belt driver having a greater diameter than an upper portion of the rotating belt driver, the belt modules near the inner edge collapse such that the protrusions maintain surface contact with the ridge surfaces of the rotating belt driver.

53. The side-flexing conveyor belt of claim 51 wherein the drive face is flat.

54. The side-flexing conveyor belt of claim 51 wherein the drive face is perpendicular to the conveying direction.

55. The side-flexing conveyor belt of claim 51 wherein the protrusion is non-rotatable.

56. The side-flexing conveyor belt of claim 51 wherein the hinge rods define hinge axes and wherein the drive face of the protrusion extending radially outward from the driving edge of the belt module is located between the hinge axes of the belt module.

* * * * *